(12) United States Patent
Ahn

(10) Patent No.: US 9,553,408 B2
(45) Date of Patent: Jan. 24, 2017

(54) USB PORT LOCKING DEVICE

(71) Applicant: Chang Hoon Ahn, Gyeongsu-daero (KR)

(72) Inventor: Chang Hoon Ahn, Gyeongsu-daero (KR)

(73) Assignee: Chang Hoon Ahn, Anyang, Gyeongsu-daero (KR)

( * ) Notice: Subject to any disclaimer, the term of this patent is extended or adjusted under 35 U.S.C. 154(b) by 0 days.

(21) Appl. No.: 15/180,545

(22) Filed: Jun. 13, 2016

(65) Prior Publication Data

US 2016/0294118 A1 Oct. 6, 2016

Related U.S. Application Data

(63) Continuation of application No. 14/815,552, filed on Jul. 31, 2015, now Pat. No. 9,391,403, which is a
(Continued)

(51) Int. Cl.
*H01R 13/639* (2006.01)
*H01R 24/62* (2011.01)
(Continued)

(52) U.S. Cl.
CPC .......... *H01R 13/6397* (2013.01); *G06F 21/85* (2013.01); *H01R 13/633* (2013.01); *H01R 24/62* (2013.01); *H01R 2201/06* (2013.01)

(58) Field of Classification Search
CPC ... H01R 13/6397; H01R 13/633; H01R 24/62; H01R 2201/06
(Continued)

(56) References Cited

U.S. PATENT DOCUMENTS 6,796,152 B1 * 9/2004 Yu ........................ E05B 73/0082
439/133
6,799,981 B1 * 10/2004 Yu ...................... H01R 13/6397
439/133
(Continued)

FOREIGN PATENT DOCUMENTS

JP 2007-066678 A 3/2007
JP 31374767 U 11/2007
(Continued)

*Primary Examiner* — Gary Paumen
(74) *Attorney, Agent, or Firm* — Mintz Levin Cohn Ferris Glovsky and Popeo, P.C.; Kongsik Kim

(57) ABSTRACT

Provided is a USB port locking device including: a blocking member having a blocking coupling part to block access of an external device; an external USB port part connected to the blocking member and to which an external USB connection port is insertively coupled; a signal connection part enabling signal transmission between a terminal inside the USB port of the electronic device and the external USB connecting port; a locking member selectively locked to the electronic device so that the blocking member is not forcedly removed; a stopping member selectively blocking an unauthorized external USB connecting port from being inserted into the external USB port part; and a lock member controlling a locking operation of the locking member and a blocking operation of the stopping member by interfering with the locking member and the stopping member when they are inserted into the blocking member.

9 Claims, 24 Drawing Sheets

Related U.S. Application Data continuation of application No. PCT/KR2014/000828, filed on Jan. 28, 2014.

(51) Int. Cl.
*H01R 13/633* (2006.01)
*G06F 21/85* (2013.01)

(58) Field of Classification Search
USPC ... 439/133, 148, 352, 357; 70/57, 14, 58, 21
See application file for complete search history.

(56) References Cited

U.S. PATENT DOCUMENTS

| | | | | |
|---|---|---|---|---|
| 7,390,201 B1* | 6/2008 | Quinby | ............. | H01R 13/6397 439/133 |
| 7,428,834 B1* | 9/2008 | Lee | ............. | E05B 67/36 439/133 |
| 7,462,045 B1* | 12/2008 | Lee | ............. | H01R 13/443 439/133 |
| 7,581,417 B1* | 9/2009 | Chen | ............. | E05B 37/025 439/133 |
| 7,635,272 B2* | 12/2009 | Poppe | ............. | H01R 13/6397 439/133 |
| 7,677,065 B1* | 3/2010 | Miao | ............. | E05B 37/02 439/133 |
| 7,913,527 B2* | 3/2011 | Chen | ............. | E05B 37/02 439/133 |
| 8,414,314 B1* | 4/2013 | Mosholder | ............. | H01R 13/44 439/133 |
| 2005/0039502 A1* | 2/2005 | Avganim | ............. | G06F 21/32 70/58 |
| 2005/0095885 A1* | 5/2005 | Lindner | ............. | H01R 13/6397 439/133 |
| 2005/0202698 A1* | 9/2005 | Miao | ............. | G06F 21/85 439/133 |
| 2010/0031710 A1* | 2/2010 | Chen | ............. | E05B 37/02 70/57 |
| 2011/0067460 A1* | 3/2011 | Niwa | ............. | G06F 21/79 70/58 |
| 2011/0300727 A1* | 12/2011 | Liang | ............. | H01R 13/639 439/133 |
| 2014/0130555 A1* | 5/2014 | Clark | ............. | E05B 35/008 70/58 |

FOREIGN PATENT DOCUMENTS

| | | |
|---|---|---|
| KR | 20-0430966 Y1 | 11/2006 |
| KR | 10-2010-0039073 A | 4/2010 |

* cited by examiner

USB PORT LOCKING DEVICE

CROSS-REFERENCE TO RELATED APPLICATIONS

This application is a continuation of U.S. application Ser. No. 14/815,552 filed on Jul. 31, 2015, which is a continuation of International Application No. PCT/KR2014/000828 filed on Jan. 28, 2014, which claims priority to Korean Application No. 10-2013-0011719 filed on Feb. 1, 2013. The applications are incorporated herein by reference.

TECHNICAL HELD

The present invention generally relates to a USB port locking device. More particularly, the invention relates to a USB port locking device, which is capable of locking and unlocking a USB port in a physical method so as to prevent data loss, virus infection and the like through a USB memory device.

BACKGROUND ART

With the development of industry and technology, the use of personal computers has rapidly increased and most institutes such as companies or government offices handle affairs using personal computers (including notebook PC), and control in various fields including machines and factory equipment, industrial facilities, military facilities, or the like is performed using computers.

Since computer use has become widespread in industry, damage frequently occurs due to the malicious infection of malicious codes or viruses into targeted computers, and loss of important information may occur thereby.

In view of the circumstances, various measures have been proposed to prevent the loss of information in offices, companies, government agencies, military facilities, or the like and to protect against the infection of the viruses or the like. However, recently, the universal application of USB ports together with the development of a memory device has enabled computers to be easily accessed, has enabled third parties to easily access a main computer and thereby frequently infect the computer with viruses and/or to steal important information.

In other words, most computers currently on the market are equipped with at least one or more universally connectable USB ports. Thus, it is possible for anyone to easily access a desired computer by connecting an USB memory device to the USB port.

Thus, an outsider as well as an insider may easily infect a computer with viruses and/or steal information by connecting a USB memory device to a computer. Accordingly, measures for preventing these problems are urgently needed.

Further, it is necessary to actively prevent USB memory devices other than pre-authorized USB memory devices from being inserted into a keyboard or mouse connection port, as well as the USB port, thus allowing only pre-authorized USB devices to be used.

SUMMARY

Accordingly, the present invention has been made keeping in mind the above problems occurring in the related art, and is intended to provide a USB port locking device, which is configured to physically block a USB port of a computer device, thus essentially preventing information leakage as well as virus infection through a USB memory device.

In an aspect, the present invention provides a USB port locking device, including: a blocking member having a blocking coupling part insertively coupled to a USB port of an electronic device to block access of an external device; an external USB port part connected to the blocking member and to which an external USB connection port is insertively coupled; a signal connection part enabling signal transmission between a terminal inside the USB port of the electronic device and the external USB connecting port inserted into the external USB port part; a locking member selectively locked to the electronic device so that the blocking member is not forcedly removed in a state of being inserted into the USB port of the electronic device; a stopping member selectively blocking an unauthorized external USB connecting port from being inserted into the external USB port part; and a lock member movably provided on the blocking member, and selectively interfering with the locking member and the stopping member depending on a moving position, thus controlling a locking operation of the locking member and a blocking member of the stopping member.

The blocking member may include a port insertion part provided on a first end thereof and having a shape corresponding to that of the USB port of the electronic device to be inserted into the USB port of the electronic device; and a guide part extending from the port insertion part, with the lock member movably installed therein to be retractable through a second end, wherein the locking member and the stopping member may be formed integrally with the blocking member to be elastically deformed or restored to their original states.

The external USB port part may be provided to be connected to an outside of the blocking member, the stopping member being disposed between the USB port part and the blocking member.

The locking member may be connected to the blocking member to be elastically deformable, and may have a locking protrusion that is interfered with and deformed by a movement of the lock member, in a state where the port insertion part is inserted into the USB port of the electronic device, and may be protruded out of the port insertion part to be locked to a locking hole formed in the USB port of the electronic device.

The stopping member may have a blocking protrusion that is interfered with and elastically deformed by an inserting operation of the lock member and is moved to an internal space of the external USB port part, thus blocking the unauthorized external USB connection port from being inserted into the external USB port part.

The signal connecting part may include a first internal structure provided in the blocking member to face a terminal in the USB port of the electronic device when the blocking member is inserted into the USB port of the electronic device; a second internal structure provided in the external USB port part; a first terminal portion exposed to a surface of the first internal structure and connected to the terminal in the USB port of the electronic device; a second terminal portion provided to be exposed to a surface of the second internal structure, and connected to an external USB connection port coupled to the external USB port part; and a connection terminal connecting the first and second terminal portions to each other.

The lock member may include an outer frame retractably provided to slide into and out of the blocking member; a locking-member-interference member extending to an outside of the outer frame in such a way that a first end thereof is coupled to an interior of the outer frame and a second end thereof is located in the blocking member, the lockingmember-interference member interfering with the locking member to be locked to an interior of the USB port of the electronic device when the lock member is inserted into the blocking member; and a lock-member internal structure provided in the outer frame and having a key hole recessed from an end exposed to an outside of a casing, and when the lock member is inserted into the blocking member, the locking-member-interference member interferes with the locking member, and the outer frame interferes with the stopping member.

The lock member may include a locking step protruding out from the outer frame to prevent the outer frame from being completely removed from the blocking member, and the lock member may further include a housing coupled to surround outsides of the blocking member and the external USB port part, with a guide groove being formed in the housing to receive and stop the locking step.

The USB port locking device may further include a release key unit selectively coupled to or separated from the key hole of the lock member to forcedly pull out the lock member inserted into the blocking member.

As described above, an USB port locking device according to the present invention is advantageous in that it is possible to physically block an USB port of an electronic device, thus essentially preventing virus infection and the loss of important information by an external intruder.

Further, an USB port locking device according to the present invention is advantageous in that it is possible to simultaneously block a plurality of neighboring USB ports, and it is possible to block and protect even an USB port to which a previously connected USB cable is connected, thus enhancing security effect.

Furthermore, an USB port locking device according to the present invention is configured such that, when a latch key of a release key unit for taking out a lock member inserted into the USB port to block it is inserted into a key hole of a lock member, the latch key is stopped by a locking groove formed in a ceiling portion of a key hole, thus essentially preventing a lock member from being taken out using a general pincette, nail, pen or the like. In addition, in order to remove the lock member from the USB port, the release key unit should be necessarily used. Therefore, such a configuration can further improve security.

Further, according to the present invention, when outside personnel for maintenance and development access a main frame (electronic device) or a server having a confidential document, an external USB terminal is connected via only an authorized port (external USB port) and then is converted into a lock state. In such a state, disconnection is impossible without an inherent release key unit. Thus, it is possible to control the illegal approach of outside personnel. That is, if the external USB terminal is connected to the PC or the server of protective equipment via the USB lock device of the present invention, and the USB lock device of the present invention is connected to an USB port of a notebook computer or other portable data media connected to an opposite side, the separation of the USB port is possible only when an administrator performs a releasing operation with the release key unit.

Therefore, after an outsider disconnects an authorized external USB connection port connected to an external USB port from an electronic device, it is impossible to connect the external USB connection port to an external USB port part, thus essentially preventing illegal access to an electronic device.

DETAILED DESCRIPTION

Figure 1:
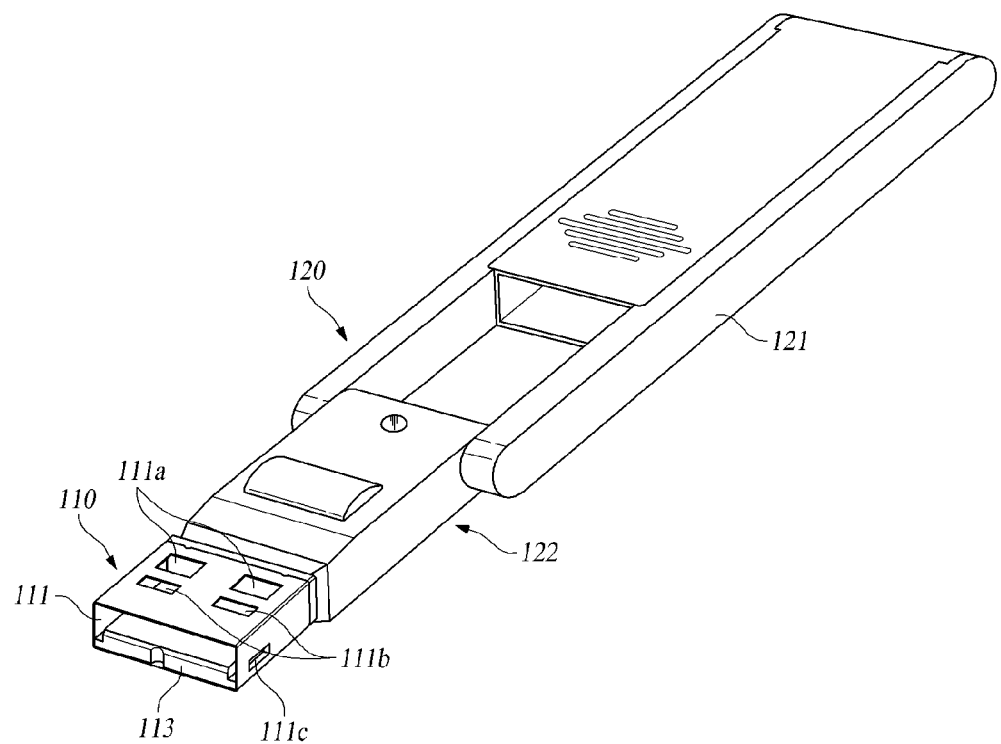
FIG. 1 is a perspective view showing a USB port locking device according to an embodiment of the present invention.
Figure 2:
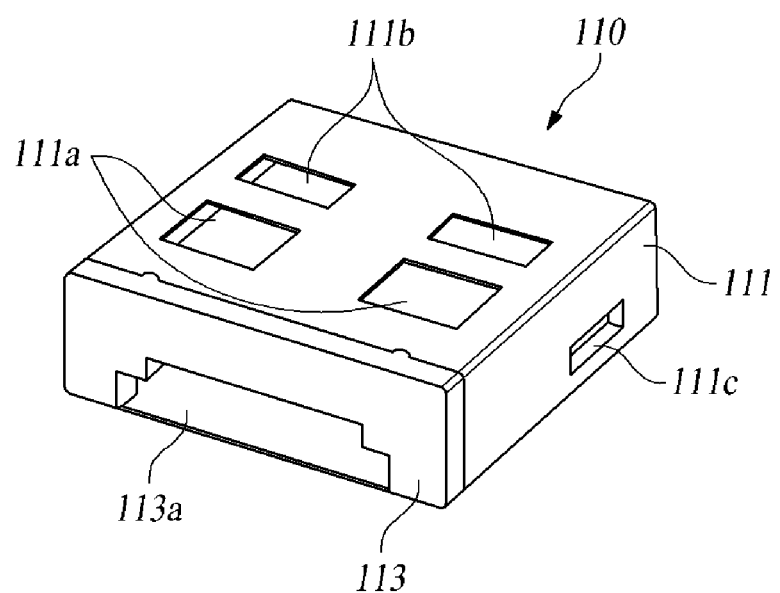
FIG. 2 is an extracted view showing a lock member of FIG. 1.
Figure 3:
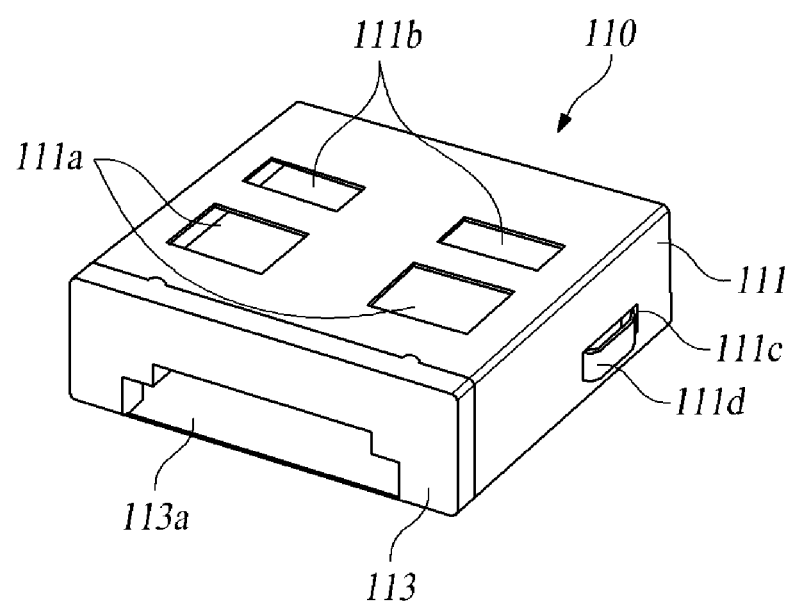
FIG. 3 is a view showing another example of the lock member of FIG. 2.
Figure 4:
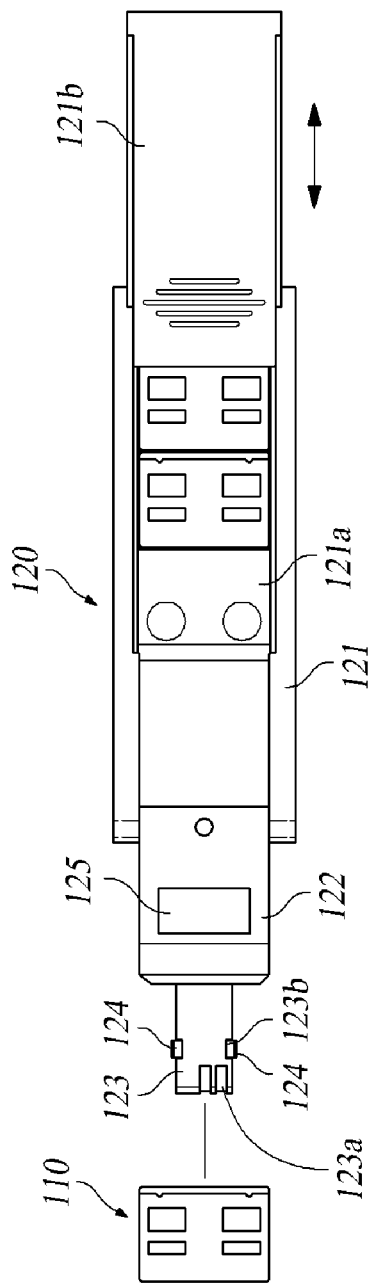
FIG. 4 is a plan view showing the USB port locking device of FIG. 1.

Hereinafter, a USB port locking device according to an embodiment of the present invention will be described in detail.

Referring to FIGS. 1 to 12, the USB port locking device 100 according to an embodiment of the present invention includes a lock member 110 and a release key unit 120.

The lock member 110 includes an outer frame 111 and an internal structure 113. The outer frame 111 has the shape of a rectangular frame, and two pairs of locking holes 111a and 111b are formed in an upper wall and a lower wall, respectively. The outer frame 111 has the shape of a rectangular frame corresponding to that of the USB port 10, and is fitted into an USB port 10. The two pairs of locking holes 111a and 111b are portions to which a locking piece 11 installed in the USB port 10 is coupled in the state where the lock member 110 is inserted into the USB port 10. These locking holes 111a and 111b are disposed to be stopped by the locking piece 11 in two stages in a connecting or disconnecting direction of the lock member 110, thus preventing the lock member 110 from being easily removed from the USB port 10. The locking holes 111a and 111b are formed in upper and lower portions of the lock member 110, respectively.

Further, a locking hole 111c may also be formed in a side surface of the outer frame 111. The locking hole 111c is elastically coupled to a locking piece (not shown) provided on an inner side surface of the USB port 10, thus preventing the lock member 110 from being easily separated from the USB port 10.

Further, a locking piece 111d (see FIG. 3) may be formed on the side surface of the outer frame 110 in place of the locking hole 111c. The locking piece 111d is in elastic contact with the side surface in the USB port 10 when being coupled to the USB port 10, thus preventing the lock to member 110 from being easily separated from the USB port 10.

The internal structure 113 is coupled to the outer frame 111 in a fitting manner. Such an internal structure 113 is inserted into the USB port 10 to be partially open and thereby provide behind the outer frame 111 a space into which the connection pin portion 12 is relatively inserted. The internal structure 113 is configured to completely block a front of the outer frame 111 with only a key hole 113a being left in front of the outer frame 111. A fixing key 123 of the release key unit 120 is inserted into the key hole.

Moreover, a key protrusion 113b is formed in the key hole 113a in a predetermined pattern to allow a predetermined associated fixing key 123 to be coupled thereto.

Further, the internal structure 113 includes a first stepped groove 113b that is recessed in a lower surface s1 in such a way as to have a height h1 corresponding to a thickness of the fixing key 123 of the release key unit 120 and a width w1 wider than a width of the fixing key 123, and a second stepped groove 113c that is recessed in a ceiling surface s2 of the first stepped groove 113b in such a way as to have a height h2 corresponding to a height of a locking step 124a of a latch key 124 and a width w2 corresponding to a width of the fixing key 124. Further, a locking groove 113e is formed at a position spaced apart from an end 113d of the internal structure 113 by a predetermined distance, is recessed from a sidewall s3 of the second stepped groove 113c, and is opened to the ceiling surface s2 of the first stepped groove 113c. The locking groove 113e comprises a pair of grooves facing each other, and serves to prevent the fixing key 123 from being removed from the lock member 110 by interference by locking the locking step 124a of the latch key 124, which will be described below, to the locking groove 113e.

Figure 7:
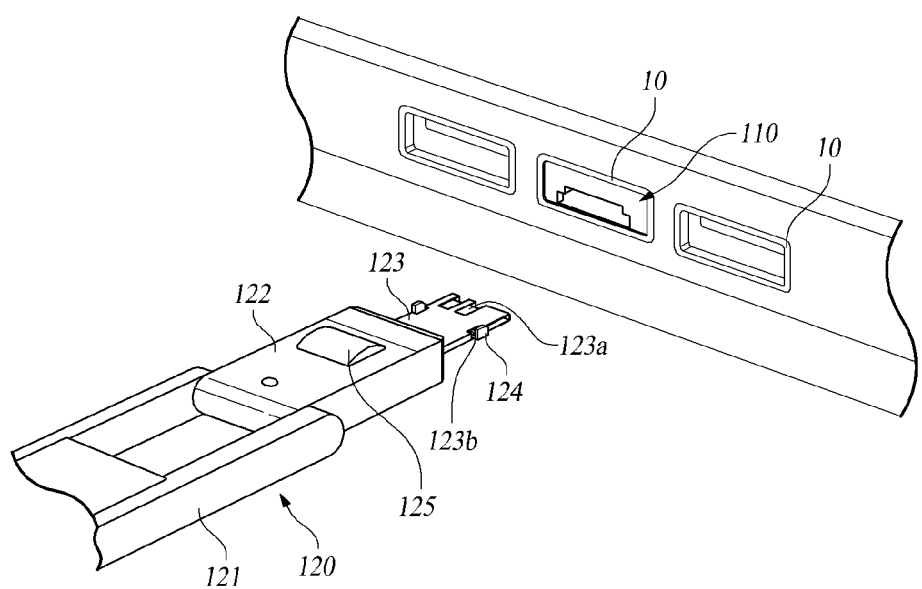

As shown in FIG. 7, when the lock member 110 constructed as described above is inserted into the USB port 10, the lock member 110 does not protrude to an outside but is completely inserted into the USB port 10. Hence, it is impossible to take the lock member 110 out in methods other than the method using the release key unit 120, thus physically and safely blocking the USB port 10.

Figure 5:
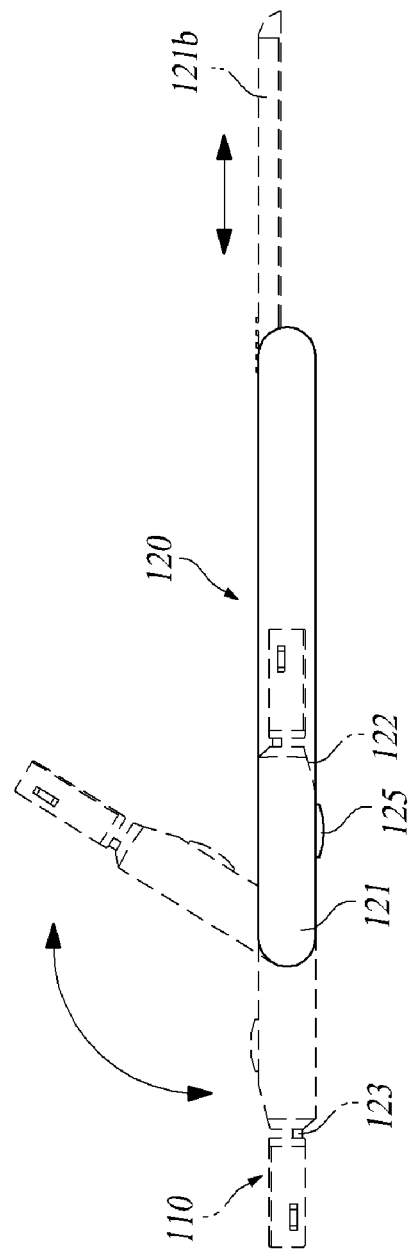
FIG. 5 is a front view showing the USB port locking device of FIG. 1.
Figure 6:
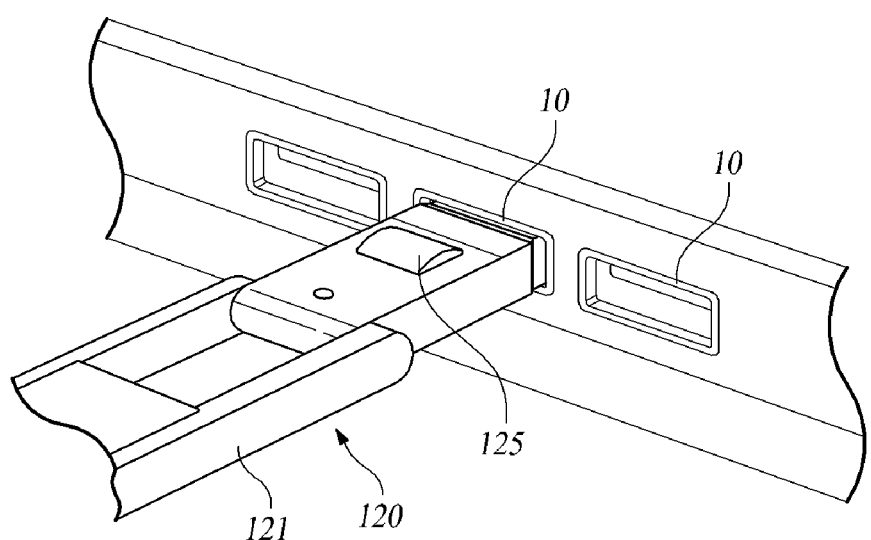
FIGS. 6 and 7 are views showing the state of physically blocking a USB port of an electronic device using the USB port locking device according to the embodiment of the present invention.

The release key unit 120 is coupled as shown in FIG. 5 to separate the lock member 110, coupled to the USB port 10 as shown in FIG. 5, from the USB port 10. Such a release key unit 120 includes an unit body 121, a key holder 122 rotatably coupled to the unit body 121, a fixing key 123 coupled to the key holder 122, a latch key 124 movably provided on the fixing key 123, and a release button 125 provided on the key holder 122.

A receiving part 121a is provided in the unit body 121 to receive a plurality of lock members 110. The receiving part 121a is opened or closed by a cover member 121b that is slidably mounted to the unit body 121.

The key holder 122 is rotatably installed at one end thereof to the unit body 121.

The fixing key 123 is coupled to the other end of the key holder 122 in such a way as to protrude therefrom. This fixing key 123 is inserted into the key hole 113a of the lock member 110, and a key groove 123a corresponding to the key protrusion 113b in the key hole 113a is formed in a front end of the fixing key 123. Thus, only when the fixing key 123 having the key groove 123a corresponding to the key protrusion 113b is put into the key hole 113a, the fixing key 123 and the latch key 124 may be completely inserted into the key hole 113a. In the state where the latch key 124 is completely inserted into the key hole 113a, the locking step 124a of the latch key 124 is stopped by the locking groove 113e in the key hole 113a.

As shown in FIGS. 9 to 12, the latch key 124 has an approximately 'U' shape when seen from a plane, and includes a resilient part 124b connected to one end thereof, and locking steps 124a provided on free ends of a pair of connecting parts 124c that extend from the resilient part 124b. Each locking step 124a is upwardly bent at approximately 90 degrees from the free end of the connecting part 124c in such a way as to protrude to an upper surface of the fixing key 123.

Figure 11:
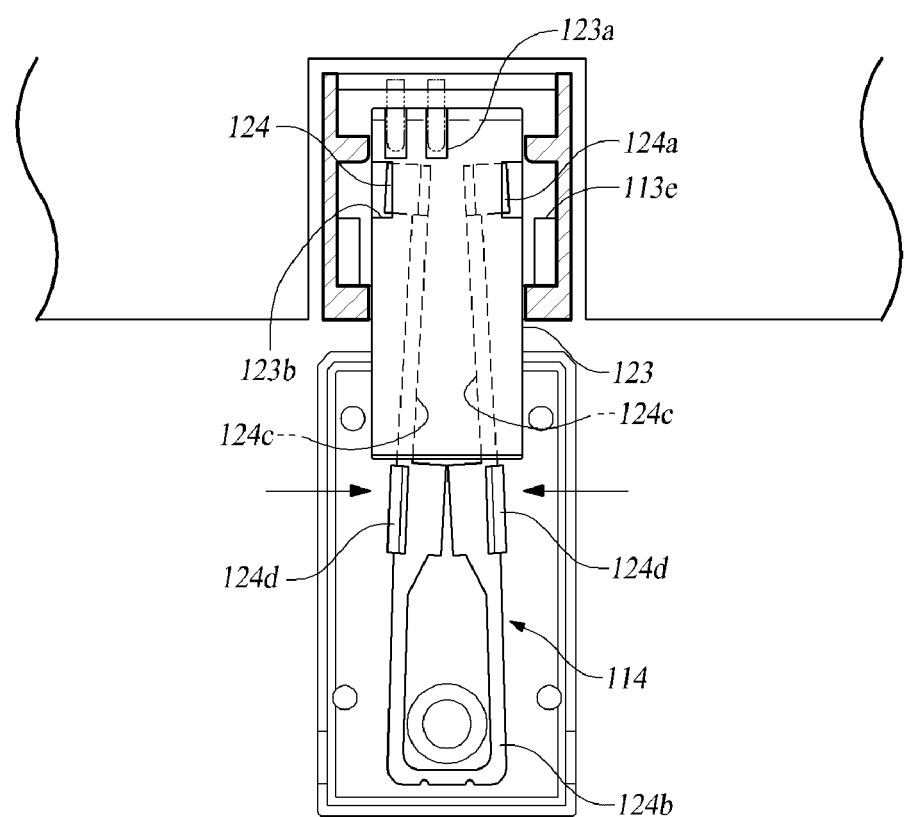
FIGS. 11 and 12 are views showing the state where a latch key is released by operating a release button from the state of FIGS. 9 and 10.
Figure 12:
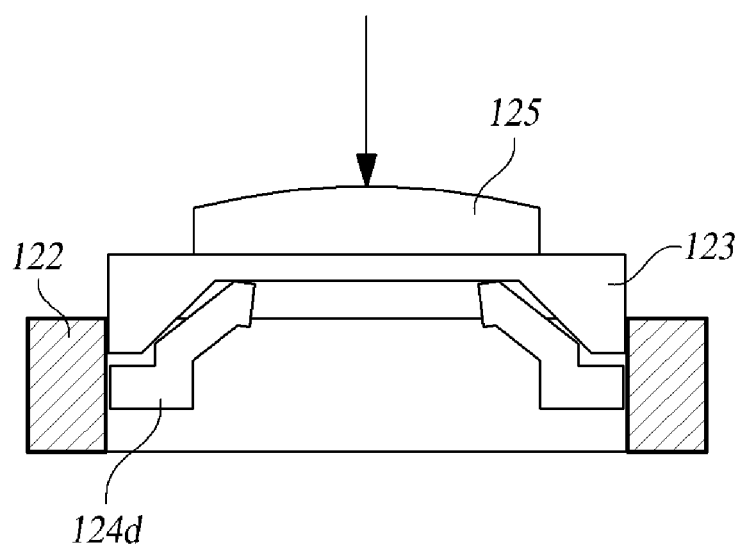
Figure 13:
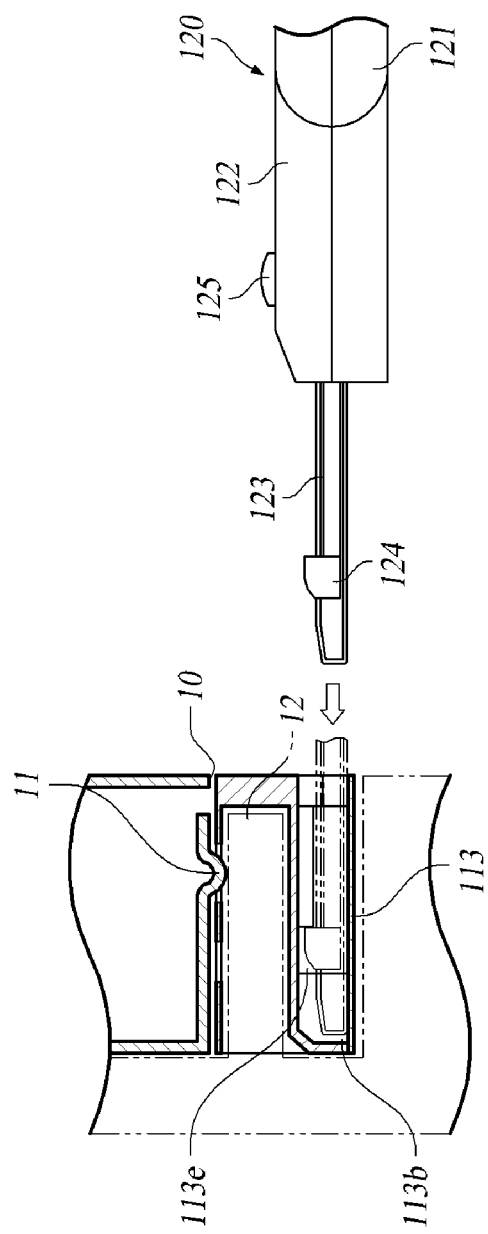
FIGS. 13 and 14 are sectional views showing the state where the release key unit is coupled to the lock member coupled to the USB port.
Figure 14:
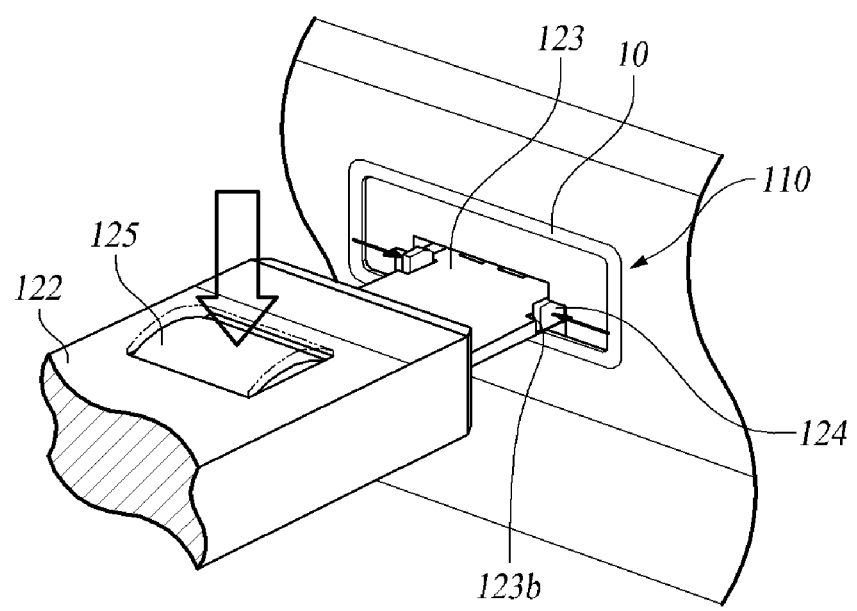
Figure 15:
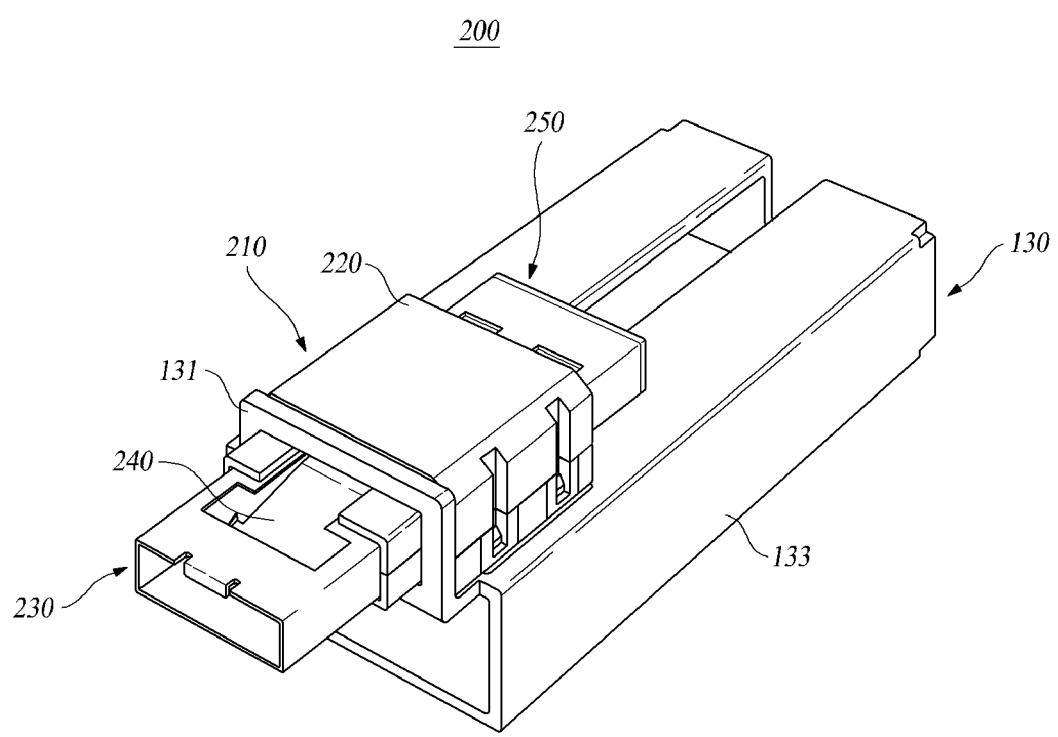
FIG. 15 is a perspective view showing a USB port locking device according to another embodiment of the present invention.
Figure 16:
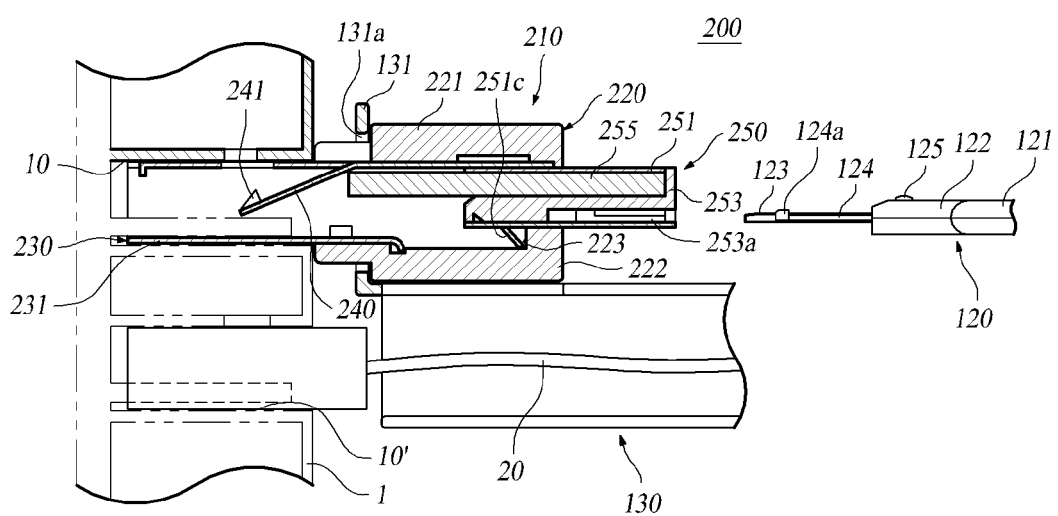
FIGS. 16 and 17 are sectional views showing the USB port locking device according to the another embodiment of the present invention.

Further, button contact parts 124d are provided on an approximately central region of the connecting part 124b to be interfered by the release button 125. If the release button 125 is pushed in the state of FIGS. 9 and 10, the button contact part 124d of the latch key 124 constructed as described above is pressed by the release button 125. Thereby, as shown in FIGS. 11 and 12, while a gap between the pair of connecting parts 124b is reduced, the locking step 124c enters the receiving groove 123b formed in the side surface of the fixing key 123 with the locking step 124c being exposed to the side surface of the fixing key 123. As such, if the locking step 124c does not protrude to the side surface of the fixing key 123 but is located in the receiving groove 123b, when the fixing key 123 is inserted into the key hole 113a as shown in FIG. 14, the locking step 124a protruding to the upper surface of the fixing key 123 is not be stopped by the ceiling surface s2 of the first stepped groove 113b but is located in the second stepped groove 113c, so that the locking step 124a may be inserted into the key hole 113a.

Figure 9:
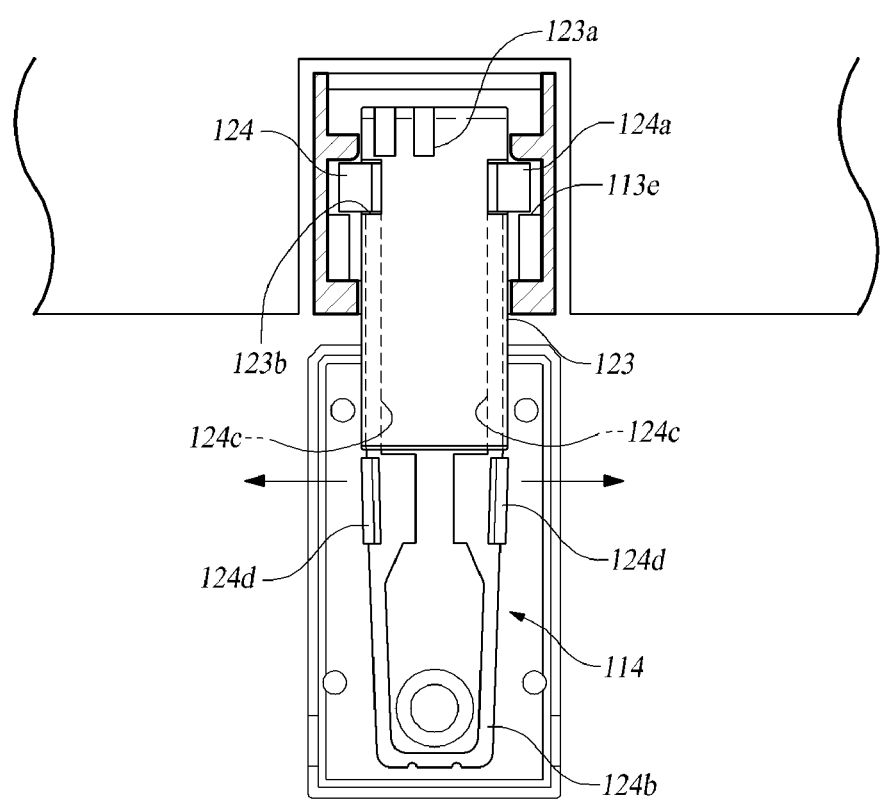
FIGS. 9 and 10 are views showing the state when a release key unit is coupled to the lock member coupled to the USB port.
Figure 10:
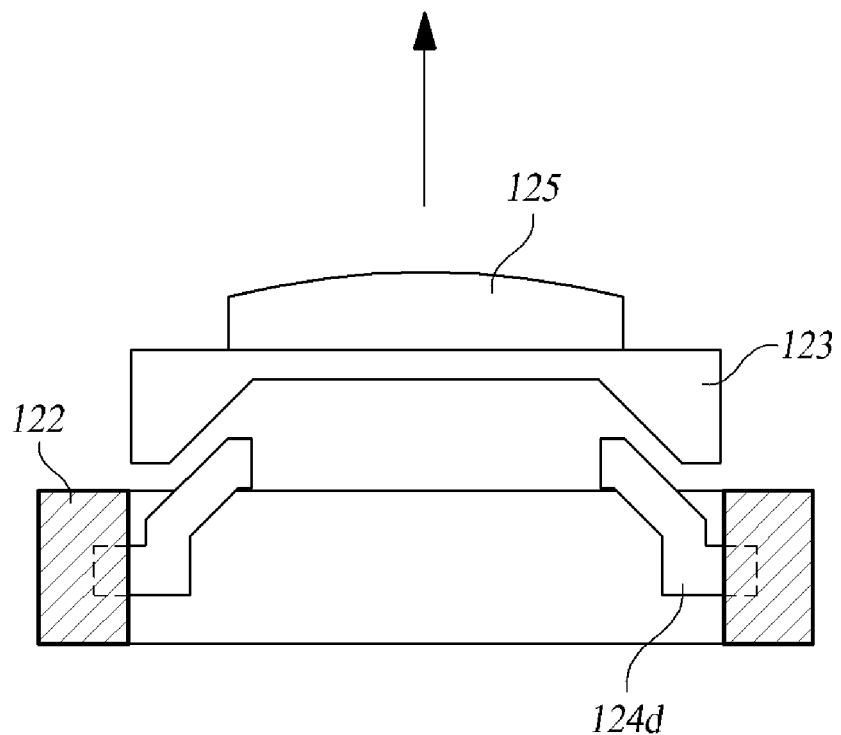

Further, if the release button 125 is released in the state where the fixing key 123 is completely inserted into the key hole 113a and the locking step 124a is located at a position corresponding to the locking groove 113e, the locking step 124a is inserted into and stopped by the locking groove 113e as shown in FIG. 9. In this state, if the release key unit 120 is pulled, the lock member 110 is guided by the locking step 124a stopped by the locking groove 113e, so that the lock member 110 is naturally removed from the USB port 10.

In the USB port locking device 100 according to the embodiment of the present invention constructed as described above, the lock member 110 is fitted into an unused USB port 10 of the electronic device 10, such as a computer. Then, the lock member 110 is completely inserted into the USB port 10. In this state, the locking hole 111b is stopped by the locking piece 11, thus preventing the lock member from being naturally pulled out. Of course, it is difficult to pull the lock member using other tools unless it is forcedly pulled out by inserting the fixing key 123 and the latch key 124 of the release key unit 120 into the key hole 113a.

Thus, such a configuration can physically prevent unauthorized persons invading institutes such as a company or a government office from connecting the USB memory device to the USB port 10 with malicious intent, thus preventing virus infection and the loss of important information.

Particularly, according to the present invention, a pair of locking holes 111a and 111b is formed in the lock member 110. A plurality of locking holes is formed in a connecting or disconnecting direction relative to the USB port 10, so that the lock member 110 is firmly supported by the locking piece 11 and is subjected to a frictional force especially in two stages, thus preventing the lock member 110 from being easily removed. Further, the pair of locking holes 111a and 111b causes the lock member 110 to be subjected to frictional force in two stages during the separation of the lock member 110, thus preventing the lock member from being easily separated unless it is forcedly pulled out using the release key unit 120.

Further, the locking groove 113e to which the locking step 124a of the latch key 124 is locked is formed on the ceiling surface in the key hole 113a, so that it is difficult to forcedly pull out the lock member 110 using a tool such as a pincette, a screw, a nail or the like. Thus, a predetermined release key unit 120 should be used to pull out the lock member 110. Thus, it is possible to safely lock the USB port 10 and protect information.

Referring to FIGS. 15 to 18, an USB port locking device 200 according to another embodiment of the present invention includes a lock unit 210, a release key unit 120, and a subsidiary blocking member 130.

The lock unit 210 includes a housing 220, a blocking member 230 coupled to the housing 220 and inserted into the USB port 10 of the electronic device 1, a locking member 240 locking the blocking member to prevent it from being removed from the USB port 10, and a lock member 250 retractably installed in the housing 220 and allowing the locking member 240 to be moved to a locking position or a release position depending on a moving position.

The housing 220 is configured such that upper and lower bodies 221 and 222 are vertically coupled with each other with the blocking member 230 and the lock member 250 located between the bodies 221 and 222. The housing 220 is formed to have a size larger than that of a passing hole 131a formed in the connecting part 131 of the subsidiary blocking member 130. Thus, the housing 220 does not pass through the passing hole 131a of the subsidiary blocking member 130 but is stopped by the passing hole 131a, so that the subsidiary blocking member 130 is stopped by the housing 220 in the state where the blocking member 230 is coupled to the USB port 10. Thereby, the separation of the subsidiary blocking member 130 is impossible.

The blocking member 230 has the shape of a rectangular frame that is hollow therein, and is coupled to the housing 210, so that a portion of the blocking member protrudes from the housing 210 with the blocking member being supported. The protruding portion 231 of the blocking member 230 is insertively coupled to the USB port 10 to block the USB port 10, and has a size and a shape corresponding to those of the USB port 10.

The locking member 240 has a locking protrusion 241 that is stopped by an inner wall (various structures such as a locking hole or a locking groove are possible) of the USB port 10 to forcedly suppress the blocking member 230 from being removed from the USB port 10. The locking protrusion 241 is configured to be upwardly bent integrally from both sides of the end of the locking member 240. The locking member 240 may be preferably configured to be elastically deformed by cutting a portion of the blocking member 230. That is, one end of the locking member 240 is integrally connected to the blocking member 230, and is kept in a state (a state shown in FIG. 8) bent into the blocking member 230.

Figure 17:
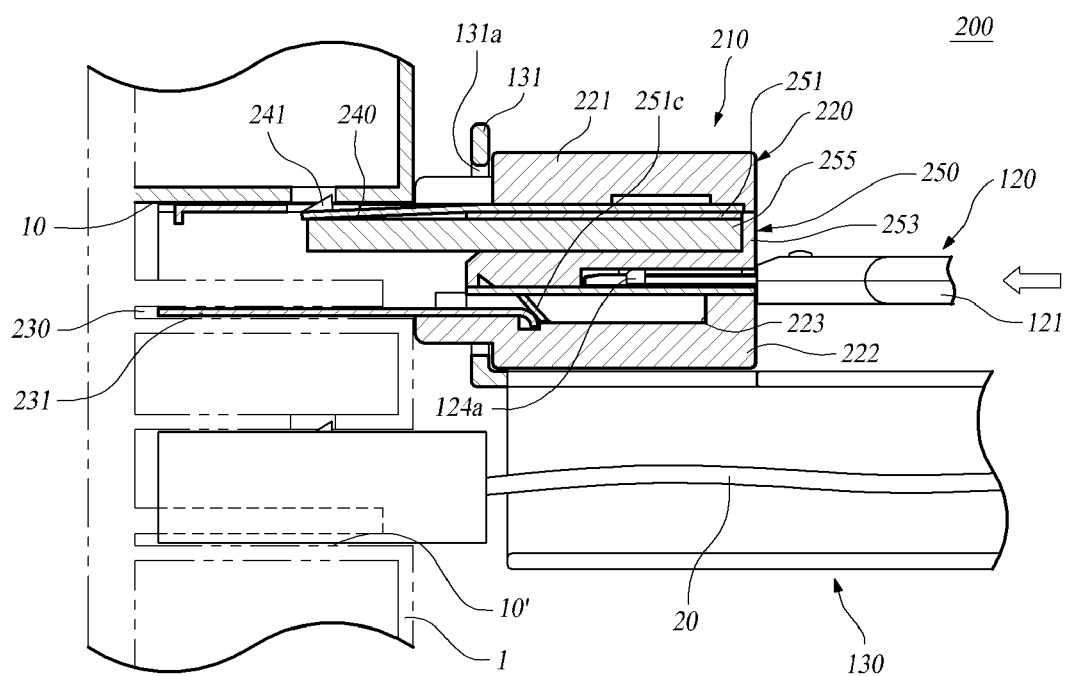

Further, when the lock member 250 is inserted into the housing 210, the locking member 240 is deformed to a position that is interfered with by the lock member 250 and locked to an inner wall of the USB port 10, so that the locking member 240 is moved and locked as shown in FIG. 17. Further, before the lock member 250 is moved to be exposed to the outside of the housing 210, the locking member 240 is kept at the locking position by the lock member 250, so that it is impossible to pull out the blocking member 220 from the USB port 10.

Figure 18:
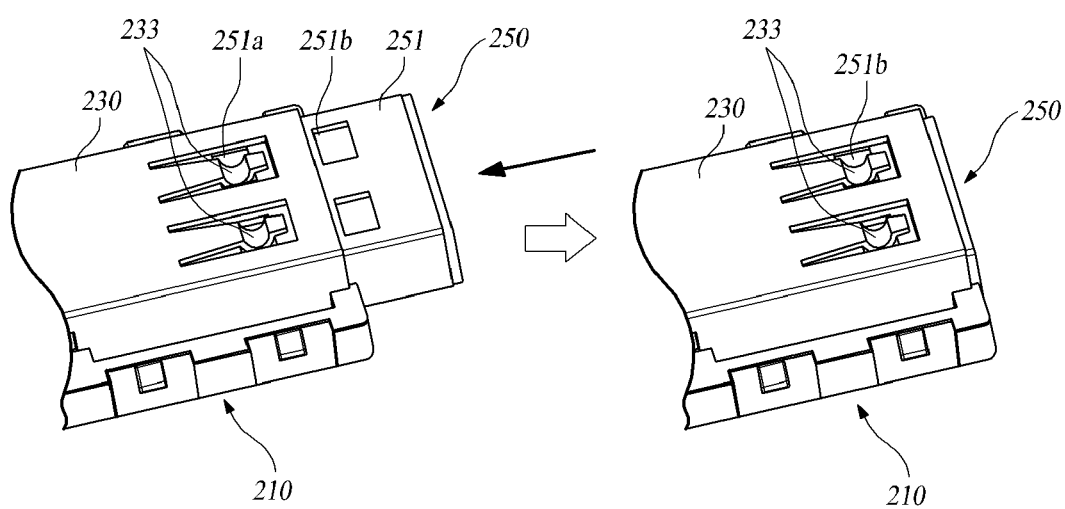
FIG. 18 is an extracted perspective view showing an important part of a lock unit shown in FIG. 15.
Figure 19:
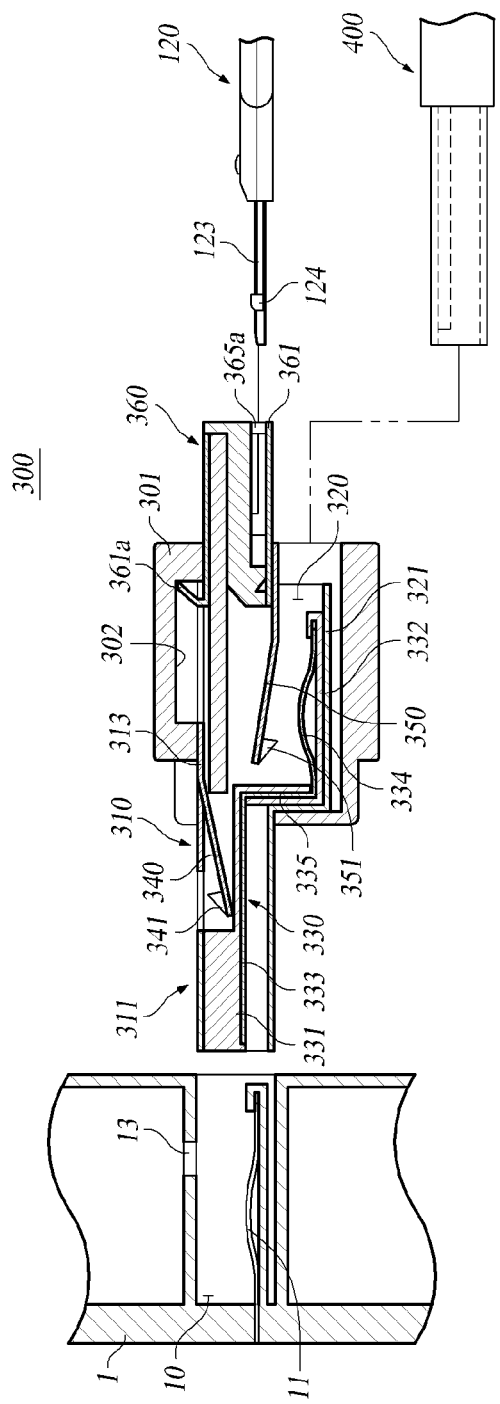
FIGS. 19 to 23 are views illustrating a USB port locking device according to a further embodiment of the present invention.

The lock member 250 is retractably installed in the housing 210. This lock member 250 includes an outer frame 251, an internal structure 253 coupled to the interior of the outer frame 251, and an interference member 255. The outer frame 251 is shaped into a rectangular frame that is open at both ends, and is made of a metal material. As shown in FIG. 18, a plurality of locking holes 251a and 251b is formed in the outer frame 251. A pair of locking holes 251a and 251b is formed, respectively, to be spaced apart from each other in the moving direction of the lock member 250. The locking pieces 233 elastically coupled to the locking holes 251a and 251b are provided on the blocking member 230 in such a way as to be elastically deformable. A portion of the blocking member 230 is cut to integrally form each locking piece 233 which protrudes elastically into the blocking member 230. Thus, as shown in FIG. 18, if the lock member 250 is inserted into the blocking member 230, the locking piece 233 is elastically coupled to the locking hole 251b, so that the lock member 250 cannot be easily removed unless it is forcedly pulled out.

Further, a stopping projection 251c is formed on the outer frame 251 in such a way as to protrude outwards from the outer frame 251, thus preventing the lock member 250 from being completely pulled out from the housing 210. A locking step 223 is formed in the housing 210 to limit the movement of the stopping projection 251c.

The internal structure 253 is coupled to occupy a predetermined space in the outer frame 251. A key hole 253a is formed in a front surface of the internal structure 253, and is configured such that the fixing key 123 and the latch key 124 of the release key unit 120 are inserted into the key hole 253a. That is, as shown in FIGS. 1 to 14, the configuration of the internal structure 253 has the same configuration as the internal structure 113 of the lock member 110. The internal structure 253 is configured such that the release key unit 120 is inserted into the key hole 253a.

Thus, as shown in FIG. 17, in the state where the lock member 250 is completely inserted into the housing 210 and the locking member 240 is moved to the locking position, the release key unit 120 should be fitted into the key hole 253a to pull the lock member 250 out from the housing 210. It is impossible to pull the lock member 250 out from the housing 210 by other methods.

Here, since those skilled in the art can easily understand the configuration and operation where the release key unit 120 is insertively coupled to the lock member 250 and the release key unit 120 is released and pulled out from the lock member 250, based on the configuration and operation of the lock member 110 and the release key unit 120 illustrated in FIGS. 1 to 14, the detailed description thereof will be omitted herein.

The interference member 255 is coupled to the outer frame 251, and is located to interfere with the locking member 240 and forcedly move it to the locking position (the state of FIG. 17) or located to allow the locking member 240 to be moved to the release position, depending on the moving position.

Figure 8A:
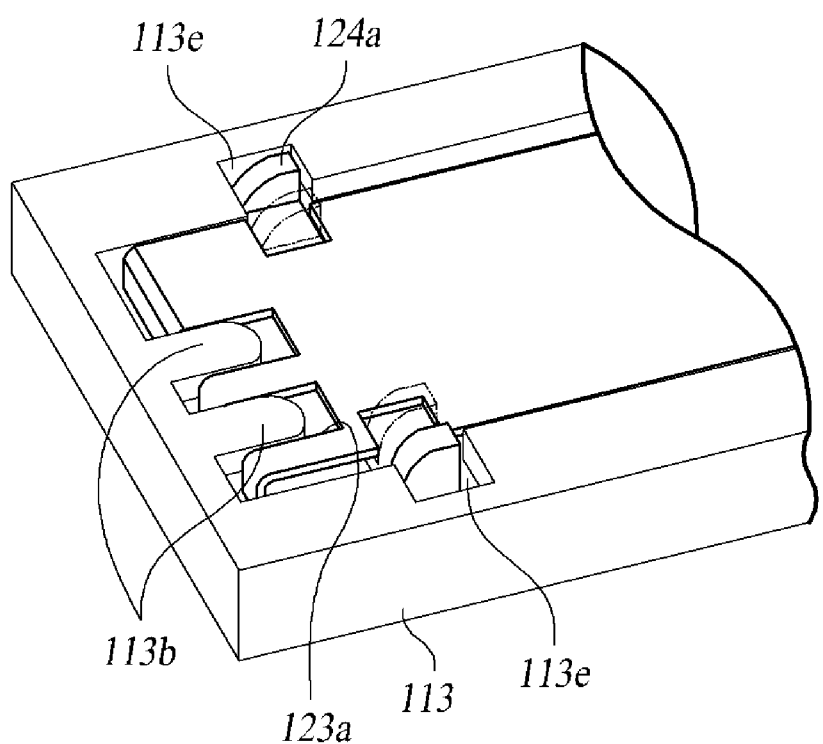
FIGS. 8A and 8B are schematic views illustrating an internal structure of the lock member.
Figure 8B:
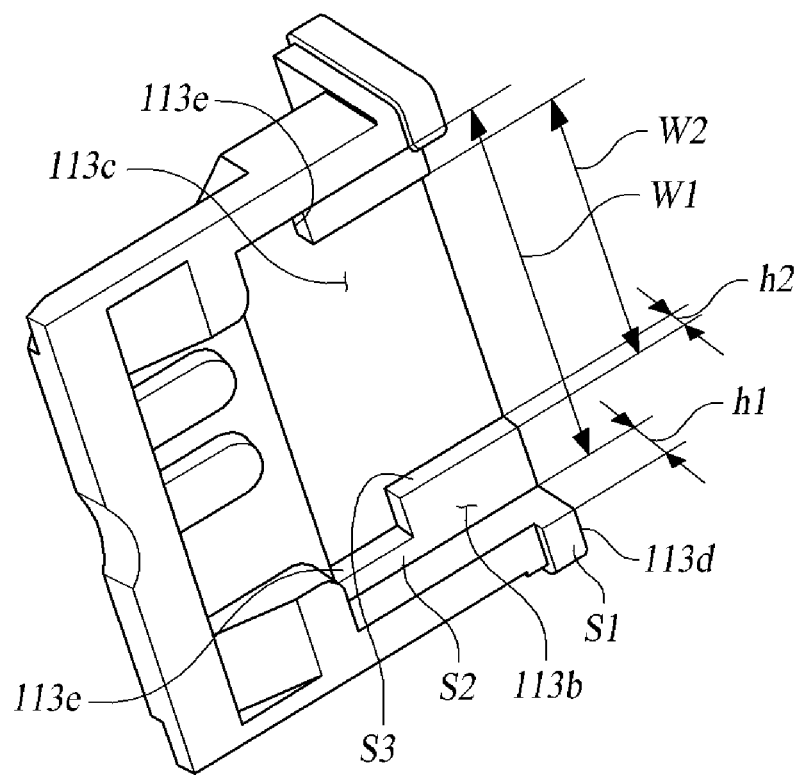

The subsidiary blocking member 130 includes a connecting part 131 to which the lock unit 210 is connected, and an outer blocking part 133 that is connected to the connecting part 131 to externally block an USB port 10' adjacent to the USB port 10 blocked by the lock unit 210. The outer blocking part 133 is open at both ends thereof, and the USB cable 20 or the like may pass through the outer blocking part 133. Thus, as shown in FIG. 8, the outer blocking part 133 may block the USB port 10' adjacent to the USB port 10 blocked by the lock unit 210 by a simple configuration and method. Since the USB cable 20 or the like may be connected via the outer blocking part 133, it is impossible to connect the memory device or the like to the USB port 10' from which the USB cable 20 is separated even if an outsider separates the USB cable 20 from the USB port 10', thus safely protecting the USB port.

That is, since the connecting part 131 is stopped by the lock unit 210 coupled to the USB port 10, it is impossible to separate the subsidiary blocking member 130 before the lock unit 210 is separated from the USB port 10, so that it is also possible to safely block another USB port 10' blocked by the subsidiary blocking member 130.

As described above, the USB port locking device 200 according to another embodiment of the present invention is advantageous in that it is possible to block the plurality of USB ports 10 and 10' together. Particularly, it has the function of safely blocking even the USB port 10' to which the USB cable 20 previously connected to the electronic device 1 is connected, thus enhancing complementary effect.

Further, referring to FIGS. 19 to 23, an USB port locking device 300 according to a further embodiment of the present invention includes a blocking member 310, an external USB port part 320, a signal connecting part 330, a locking member 340, a stopping member 350, a lock member 360, and a release key unit 120.

The blocking member 310 is insertively coupled to the USB port 10 of the electronic device 1 to block the access of an external device, and has the shape of a rectangular frame that is hollow therein. Such a blocking member 310 is installed in a housing 301 coupled to surround an outside including the external USB port part 320. The blocking member 310 includes a port insertion part 311 that is provided on an end thereof in such a way as to be coupled to the housing 301 and protrude from the housing 301 in a supported state and is inserted into the USB port 10 of the electronic device 1, and a guide part 313 that extends to the port insertion part 311 and is located in the housing 301 to guide the movement of the lock member 360. The port insertion part 311 has the size and the shape corresponding to those of the USB port 10 of the electronic device 1.

The external USB port part 320 is connected to the blocking member 310, and is provided such that an external USB connection port 400 is inserted and coupled thereto. Here, the external USB connection port 400 may be an USB port for connecting a mouse or a keyboard. Such an external USB port part 320 is provided with a frame 321 to which the blocking member 310 is connected, and the frame 321 is configured to be open, thus allowing the external USB connection port 400 to enter an end. The frame 321 may be made of a metal material and may be formed integrally with the blocking member 310.

The signal connecting part 330 serves to connect the terminal 11 in the USB port 10 of the electronic device 1 and the external USB connection port 400 inserted into the external USB port part 320 in such a way as to permit signal transmission. Such a signal connecting part 330 includes a first internal structure 311 that is installed in the blocking member 310 to face the terminal 11 in the USB port 10 of the electronic device 1 when the blocking member 310 is inserted into the USB port 10 of the electronic device 1, a second internal structure 312 that is installed in the external USB port part 320, a first terminal portion 333 that is exposed to a surface of the first internal structure 311 and is connected to the terminal 11 in the USB port 10 of the electronic device 1, a second terminal portion 334 that is installed to be exposed to a surface of the second internal structure 332 and is connected to the external USB connection port 400 inserted into the external USB port part 320, and a connection terminal 335 connecting the first and second terminal portions 333 and 334 to each other. The first and second terminal portions 333 and 334 may be integrated with each other and then installed in the blocking member 310 and the external USB port part 320. Further, the first and second terminal portions 333 and 334 and the connection terminal 335 may be integrated with each other, and may be integrally installed in the first and second internal structures 331 and 332.

The locking member 340 is selectively locked to the electronic device 1 so as to prevent the inserted blocking member 310 form being forcedly removed from the USB port 10 of the electronic device 1. Such a locking member 340 may be formed integrally with the blocking member 310, and a free end thereof opposite to a portion connected with the blocking member 310 has a locking protrusion 341 that is located in the blocking member 310 and is interfered and moved by the moving lock member 360 (see FIG. 22) to be stopped by the inner wall 113 (various structures such as the locking hole or the locking groove are possible) of the USB port 10. Such a locking member 340 has the same structure as the above-described locking member 240, and is operated in the same manner, namely, is selectively interfered or released by the lock member 360. Thus, the detailed description of the structure and operation will be omitted herein.

Figure 21:
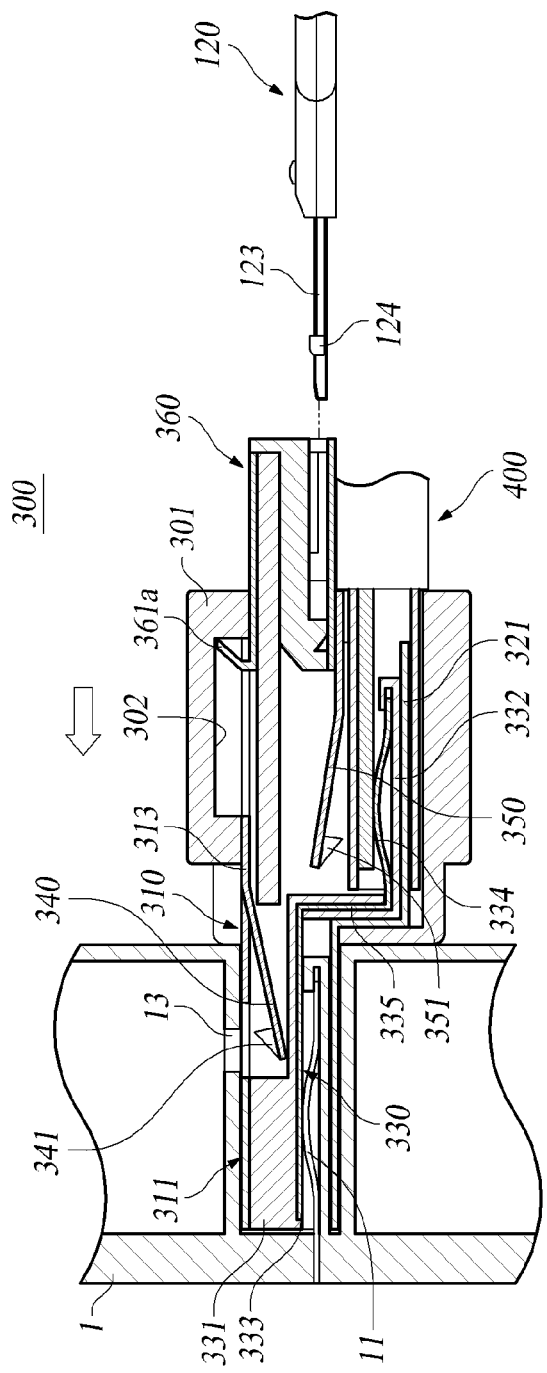
Figure 22:
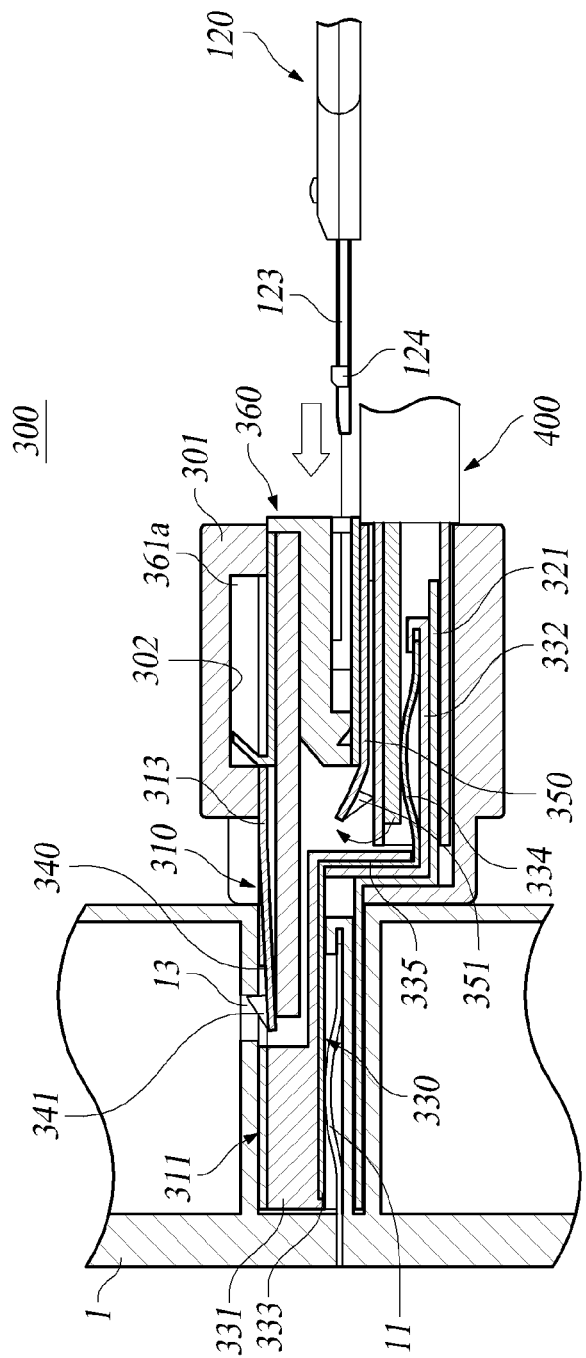

The stopping member 350 blocks an unauthorized external USB connection port from being inserted into the external USB port part 320. Here, a pre-authorized external USB connection port 400 is an external USB connection port that is previously coupled to the external USB port part 320 before the locking member 340 and the stopping member 350 are located at the locking position and the lock position, respectively, by pushing the lock member 360 as shown in FIG. 22 after the blocking member 310 is inserted into the USB port 10 of the electronic device 1 as shown in FIG. 21. Thus, the external USB connection port, which is not previously coupled to the external USB port part 320 but is to be later coupled thereto, is considered to be unauthorized. The stopping member 350 may be formed integrally with the blocking member 310. In the state where an opposite side of the locking member 340 is partially cut and then is bent to an internal space of the blocking member 310 at a predetermined angle, when the stopping member is interfered by the lock member 360, the stopping projection 351 provided on the front end of the stopping member is elastically deformed to enter the internal space of the external USB port part 320. Of course, when the lock member 360 interferes with the stopping member 350 with the authorized external USB connection port 400 entering, as shown in FIG. 22, the stopping projection 351 is in elastic close contact with the pre-inserted external USB connection port 400 to be locked. In this state, in order to pull the external USB connection port 400 out, the lock member 360 should be moved to an initial position using the release key unit 120 to release a locking state. Only in this state, it is possible to safely separate the external USB connection port 400. Therefore, another unauthorized external USB connection port cannot be connected to the electronic device 1.

Figure 23:
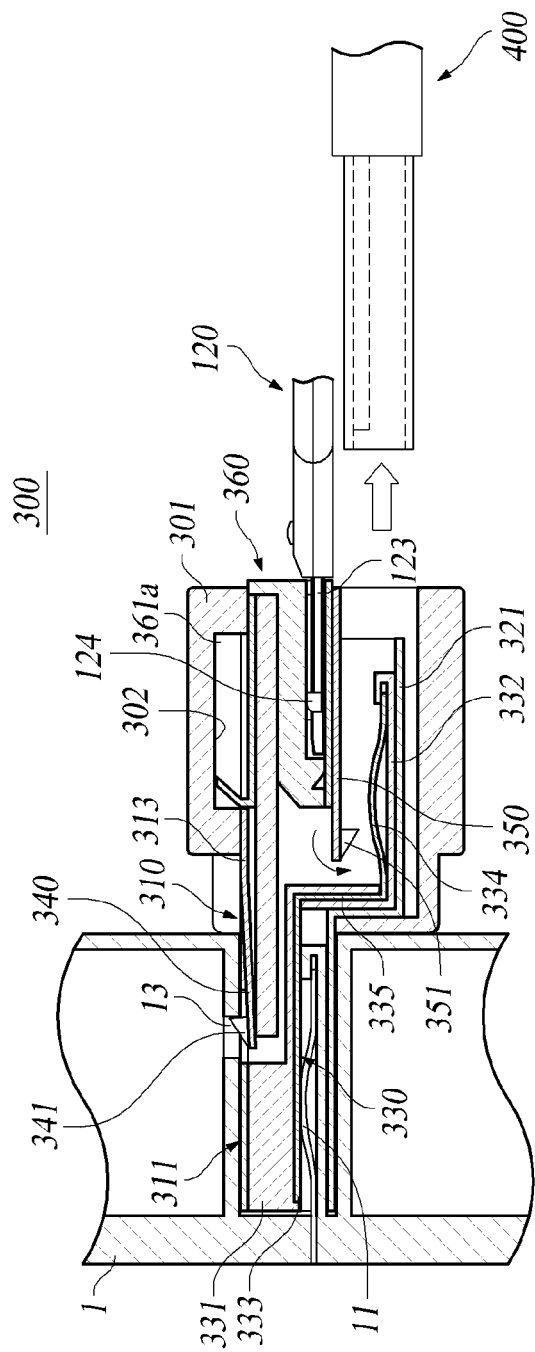

Further, even if the pre-inserted external USB connection port 400 is forcedly pulled out, in this case, the stopping projection 351 is elastically deformed as shown in FIG. 23, so that the external USB port part 320 is located in an internal space and thereby it is possible to block the insertion of the unauthorized external USB connection port.

The lock member 360 is retractably installed in the blocking member 310, and interferes with the locking member 340 and the stopping member 350 when the lock member is inserted into the blocking member 310, thus controlling the locking operation of the locking member 340 and the blocking operation of the stopping member 350. Such a lock member 360 includes an outer frame 361 that is retractably installed to slide into and out of the blocking member 310, a locking-member-interference member 363, and an internal structure 365.

The outer frame 361 has a configuration similar to that of the above-described outer frame 251 of the lock member 250, is shaped into a rectangular frame that is open at both ends thereof, and is made of a metal material. Since a specific configuration of the outer frame 361 may have the same configuration as the outer frame 251 illustrated in FIG. 18, and the blocking member 310 corresponding to the outer frame 361 may also have the same configuration (the locking piece and the locking hole) as the above-described blocking member 230, the detailed description thereof will be omitted herein. Further, the stopping projection 361a is formed on the outer frame 361 to be stopped by the guide groove 302 formed in the housing 301, thus limiting the moving distance of the lock member 360 in the blocking member 310 and preventing the lock member from being completely separated.

The locking-member-interference member 363 is coupled to the interior of the outer frame 361, and is located to interfere with the locking member 340 to and forcedly move it as shown in FIG. 22 or located at a position (FIG. 21) to allow the locking member 340 to be moved to the release position, depending on the moving position.

Here, the stopping member 350 is configured to be selectively interfered with and to have its posture changed depending on the moving position of the outer frame 361. However, the stopping member 350 may be configured to be interfered with by a separate interference member, such as the interference member 363, installed at the outer frame 361, depending on the moving position.

The internal structure 365 is coupled to occupy a predetermined space in the outer frame 361. A key hole 365a is formed in a front surface of the internal structure 365, and a fixing key 123 and a latch key 124 of the release key unit 120 are insertively coupled to the key hole 365a. Since the configuration of the internal structure 365 has the same configuration as the internal structure 113 of the lock member 110 illustrated in FIGS. 1 to 14, the detailed description thereof will be omitted herein.

Figure 20:
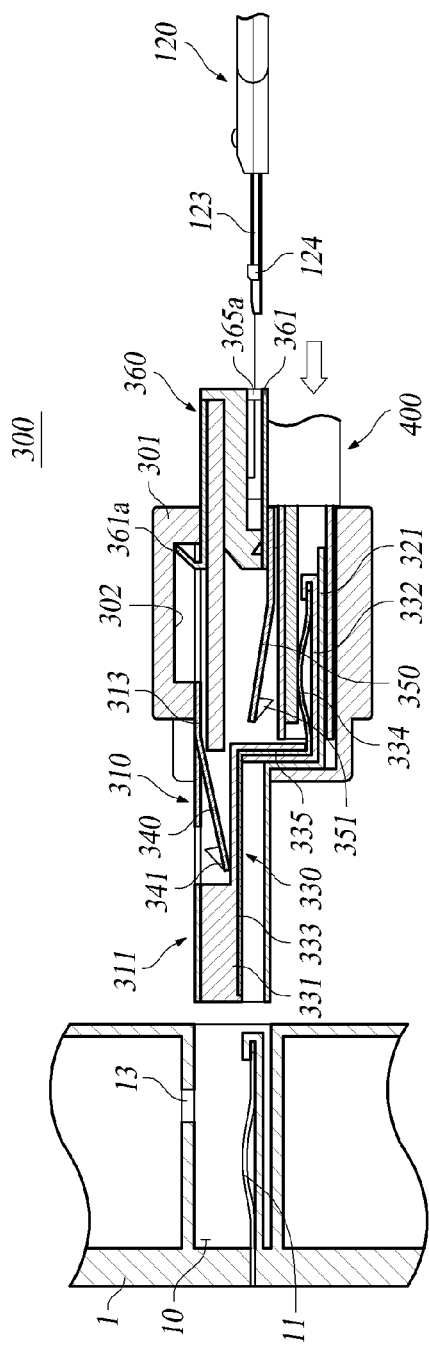

By the configuration, as shown in FIG. 20, before the blocking member 310 is coupled to the USB port 10 of the electronic device 1 to block it, the pre-authorized external USB connection port 400 is inserted into the external USB port part 320.

In such a state, as shown in FIG. 21, the blocking member 310 is insertively coupled to the USB port 10 of the electronic device 1. Subsequently, as shown in FIG. 22, the lock member 360 is pushed to be completely inserted into the outer frame 361. Then, the inserted locking-member-interference member 363 interferes with the locking member 340 to displace it, and the locking member 340 is pushed by the interference member 363, so that the locking protrusion 363a is stopped by the locking hole 13 in the USB port 10. In the state where the locking protrusion 363a is stopped by the locking hole 13, the blocking member 310 cannot be forcedly separated from the USB port 10 of the electronic device 1. In FIG. 22, the state where the stopping projection 351 is interfered with by the lock member 360 and then elastically deformed is exaggeratedly shown for a reader's better understanding. By appropriately adjusting the length of the lock member, the length of the stopping member 350 and the height of the stopping projection 351, natural elastic deformation is possible.

Further, when the lock member 360 is pushed to be inserted into the outer frame 361, the interference member 350 is also interfered with by the lock member 360 to be elastically deformed, so that its free end is elastically pushed towards the external USB port part 320 and is in contact with the pre-inserted external USB connection port 400.

By pushing the lock member 360 as such, the blocking member 310 is in a state where it is not forcedly pulled out, and the pre-inserted external USB connection port 400 is connected to the terminal 11 of the electronic device 1 by the signal connecting part 330 to permit signal transmission. Further, if the USB port 10 of the electronic device 1 is a port for connecting a keyboard or a mouse, in the state when the blocking member 310 is coupled to block the USB port, the pre-authorized keyboard or mouse connection port 400 (external USB connection port) may be connected to the external USB port part 320 to be used.

If somebody forcedly pulls the pre-authorized external USB connection port 400 out from the external USB port part 320 as shown in FIG. 23, the free end of the stopping member 350, namely, a portion of the stopping projection 351 is restored by an elastic restoring force to be located in the external USB port part 320.

Thus, in such a state, if an external intruder inserts an unauthorized external USB connection port (a memory device, an USB cable, or the like), the stopping projection 351 of the stopping member 350 prevents the external USB connection port from being completely inserted, so that access to the electronic device 1 in such a way as to transmit a signal is consequently impossible.

Meanwhile, in order to separate the blocking member 310 from the electronic device 1, the lock member 360 should be moved to an initial position, namely, moved to be exposed to an outside of the blocking member 310. Even in this case, as illustrated in FIGS. 1 to 14, it is possible to pull the lock member 360 out using the release key unit 120, and it is impossible to pull the lock member 360 out using other tools.

According to the present invention, when outside personnel for maintenance and development access a main frame or a server having a confidential document, it is impossible to separate the inserted authorized port without the inherent release key unit, so that it is possible to control the illegal approach of outside personnel. That is, if the external USB terminal is connected to the PC or the server of protective equipment via the USB port lock device of the present invention, and the USB port lock device is also connected to the USB port of a connected notebook computer or other portable data media, the separation of the USB port is possible only when an administrator performs a releasing operation with the release key unit.

Further, even when the keyboard or the mouse is connected to the external USB port part, it is possible to essentially block the unauthorized external USB connection port from being inserted into a portion from which the pre-authorized keyboard or mouse is pulled, thus further improving the security of the electronic device 1. Furthermore, even in the case of blocking the plurality of USB ports, which are proximate to each other, the present invention allows the thickness of the USB port locking device to be minimized, thus enabling very effective use.

Although the embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS OF IMPORTANT PARTS 10, 10' ... USB port 20 ... USB cable
100, 200, 300 ... USB port locking device
110, 250, 360 ... lock member
120 ... release key unit 130 ... subsidiary blocking member
210 ... lock unit 220 ... housing
230, 310 ... blocking member 240, 340 ... locking member
320 ... external USB port part 330 ... signal connecting part
350 ... stopping member

The invention claimed is:

1. A USB port locking device, the device comprising:
a lock member including:
an outer frame formed in a shape corresponding to a shape of a USB port of an electronic device; and
an internal structure provided in the outer frame with a key hole formed in a front of the internal structure, the lock member being insertively coupled to the USB port; and
a release key unit having a latch key selectively stopped by or released from the key hole by being inserted into the key hole to forcedly pull out the lock member inserted into the USB port,
wherein the internal structure includes a locking groove to which the latch key inserted into the key hole is locked, the locking groove being formed in a ceiling portion in the key hole by being recessed; and
multiple pairs of locking holes, to which locking pieces provided in the USB port are elastically coupled, are formed in the outer frame to be spaced apart from each other in a connecting or disconnecting direction of the lock member when the lock member is inserted into the USB port.

2. The device of claim 1, wherein a locking piece externally protruding is provided in the outer frame so that the locking piece is in elastic contact with an inner wall of the USB port when the lock member is inserted into the USB port.

3. The device of claim 2, wherein the locking piece is provided on a side surface of the outer frame.

4. The device of claim 1, wherein the multiple pairs of locking holes are formed on at least one of an upper wall and a lower wall of the outer frame.

5. The device of claim 1, wherein the release key unit comprises:
a unit body;
a key holder movably provided in the unit body;
a fixing key protruding from a front end of the key holder, and being inserted into the key hole of the lock member;
a latch key provided with a locking step formed on a front end of the latch key so that the locking step selectively protrudes from a side surface of the fixing key, and configured such that the locking step is prevented from being removed from the key hole by being interfered with by an interior of the key hole in a state where the fixing key is inserted into the key hole; and
a release button provided on the key holder, and selectively operated so that the locking step is released from the interior of the key hole by interfering with the latch key.

6. A USB port locking device, wherein the device comprises:
a lock unit including:
a housing;
a blocking member being coupled to the housing, and blocking a USB port of an electronic device by being coupled to the USB port;
a locking member locking the blocking member to prevent the blocking member from being removed from the USB port in a state where the blocking member is inserted into the USB port; and
a lock member movably provided in the housing to move the locking member to a locking position depending on a moving position of the lock member;
a release key unit selectively coupled to and separated from the lock member so that the lock member that has moved for moving the locking member to the locking position to be locked is moved to an allowance position allowing the locking member to be moved to a release position; and
a subsidiary blocking member including:
a connecting part interfered with by the lock unit in such a way that that the lock unit coupled to the USB port passes through the connecting part; and
an external blocking part connected to the connecting part, and configured to externally block another USB port adjacent to the USB port blocked by the lock unit.

7. The device of claim 6, wherein the blocking member is formed in a rectangular frame shape corresponding to a shape of the USB port, and the locking member is integrally formed with the blocking member by cutting a portion of the blocking member so that the locking member is elastically deformable.

8. The device of claim 6, wherein the lock member comprises:
an outer frame movably provided in a reciprocating motion in the blocking member and the housing, and configured to have multiple pairs of locking holes in a moving direction of the lock member;
an internal structure provided in the outer frame, and configured to have a key hole formed in a portion exposed to an outside of the housing, the release key unit being coupled to the key hole; and
an interference member provided in the outer frame, and configured to interfere with the locking member when the interference member is moved so that the locking member is locked to an inner wall of the USB port by protruding out from the outer frame.

9. The device of claim 8, wherein a stopping projection interfered with by a locking step provided in the housing is provided on the outer frame by protruding out from the outer frame to prevent the lock member from escaping from the housing; and
a locking piece elastically coupled to a locking hole formed in the outer frame is provided in the blocking member in a state where the lock member is moved to the locking position of the locking member.

* * * * *